(12) United States Patent
Patterson et al.

(10) Patent No.: US 8,815,324 B2
(45) Date of Patent: Aug. 26, 2014

(54) ALL-NATURAL FRUIT PRODUCT AND METHOD OF MAKING SAME

(75) Inventors: Patrick Patterson, Palatine, IL (US); Denise Fong, Alameda, CA (US)

(73) Assignee: Tropicana Products, Inc., Bradenton, FL (US)

( * ) Notice: Subject to any disclaimer, the term of this patent is extended or adjusted under 35 U.S.C. 154(b) by 705 days.

(21) Appl. No.: 12/605,539

(22) Filed: Oct. 26, 2009

(65) Prior Publication Data

US 2010/0112172 A1 May 6, 2010

Related U.S. Application Data

(63) Continuation of application No. 11/298,050, filed on Dec. 9, 2005, now abandoned, which is a continuation of application No. 11/273,230, filed on Nov. 14, 2005, now abandoned.

(51) Int. Cl.
*A23L 1/0524* (2006.01)
*A23L 3/00* (2006.01)
*A23L 1/064* (2006.01)

(52) U.S. Cl.
USPC ........... 426/639; 426/519; 426/520; 426/521; 426/573; 426/658

(58) Field of Classification Search
USPC .................. 426/639, 658, 573, 519, 520, 521
See application file for complete search history.

(56) References Cited

U.S. PATENT DOCUMENTS

| | | | |
|---|---|---|---|
| 2,878,127 A | 3/1959 | Forkner | |
| 3,367,783 A | 2/1968 | Billerback | |
| 4,205,093 A | 5/1980 | Blake | |
| 4,496,603 A | 1/1985 | Manabe et al. | |
| 4,834,990 A | 5/1989 | Amer | |
| 5,077,075 A | 12/1991 | Wade | |
| 5,260,083 A | 11/1993 | Brain et al. | |
| 5,270,071 A | 12/1993 | Sharp et al. | |
| 5,324,531 A | 6/1994 | Hoefler et al. | |
| 5,385,747 A | 1/1995 | Katz et al. | |
| 5,397,588 A | 3/1995 | Antenucci et al. | |
| 5,422,132 A | 6/1995 | Caden et al. | |
| 5,451,420 A | 9/1995 | Brain et al. | |
| 5,516,535 A | 5/1996 | Heckert et al. | |
| 5,688,548 A | 11/1997 | Gaither et al. | |
| 5,773,071 A | 6/1998 | Gaither et al. | |
| 6,171,633 B1 | 1/2001 | Dulebohn et al. | |
| 6,596,334 B1 | 7/2003 | Flickinger et al. | |
| 2003/0099753 A1 | 5/2003 | Yang | |
| 2004/0081741 A1 | 4/2004 | Levi et al. | |
| 2004/0208975 A1 | 10/2004 | Kuhns et al. | |
| 2004/0235787 A1 | 11/2004 | Beck et al. | |
| 2005/0013913 A1 | 1/2005 | Lidster et al. | |
| 2005/0074535 A1 | 4/2005 | Dulebohn et al. | |

OTHER PUBLICATIONS

Lopez, Anthony A Complete Course in Canning, The Canning Trade, Baltimore, MD,11[th] Ed., 1981, pp. 86, 126, 238, 284.*
Canadian Intellectual Property Office—Patent Application No. 2,568,283—Examiner's Requisition dated Oct. 21, 2008.
Norma M. Mac Rae R.D.—Canning and Preserving without Sugar (1983) pp. 8-12, 21-25, 48-56, 58-70, 103-105, Pacific Search Press, Seattle, Washington, U.S.A.

* cited by examiner

*Primary Examiner* — Helen F Heggestad
(74) *Attorney, Agent, or Firm* — Banner & Witcoff, Ltd.

(57) ABSTRACT

An all-natural fruit product and method of making the product is provided. The fruit product comprises fruit puree, an added natural sweetener and no non-natural sweeteners, about 0.05% to about 0.5% by total weight of the fruit product of a galactomannan, added pectin in an amount of from about 0.4% to about 2.0% by total weight of the fruit product. The fruit product has a pH of about 3.0 to about 4.2, is shelf stable and has a Brix of from about 20° to about 40°.

9 Claims, No Drawings

ALL-NATURAL FRUIT PRODUCT AND METHOD OF MAKING SAME

CROSS-REFERENCE TO RELATED APPLICATION

This application is a Continuation of application Ser. No. 11/298,050 filed Dec. 9, 2005, which is a Continuation and claims priority of application Ser. No. 11/273,230 filed Nov. 14, 2005, now abandoned. The entirety of each application is incorporated by reference herein.

TECHNICAL FIELD

The invention relates to all-natural, shelf-stable fruit products and a method of making such products.

BACKGROUND OF THE INVENTION

The consumption of fresh fruit can be difficult and inconvenient. Fresh fruit generally has a very limited shelf life and thus must be obtained on a regular basis. Increasingly, the scientific community has found that eating fiber including the fiber in fruit is important in maintaining a healthy lifestyle. Fruit juice can be conveniently available with a reasonably good shelf life when refrigerated. However, fruit juice is generally not a very good source of fiber. Fresh fruit is also good source of electrolytes, minerals, carbohydrates, and vitamins.

In addition, fresh fruit is a seasonal item. It is ripe only for a limited time and also only during certain times of the year. The transportation of fruit over long distances has increased the availability of fruit year round, but often consumers find the fruit to be not as good as locally grown fruit.

In addition, because fruit is a perishable item, the distribution of fruit has to occur over relatively long distances in a short period of time. This increases the price of fruit to consumers.

In view of the foregoing, there is a need for an all-natural, shelf-stable fruit product that can be distributed and stored without refrigeration.

Consumers are increasingly wary of artificial, synthetic, or non-natural ingredients. At the same time, consumers used to the blending of different flavors including non-natural flavors, demand exciting flavors. In addition, there is a need for all-natural products in a variety of desirable flavors.

SUMMARY OF THE INVENTION

In accordance with one aspect of the invention, a shelf-stable fruit product is provided which is a good source of fiber and can be made in a variety of exciting flavors with all-natural ingredients. The fruit product comprises fruit puree, an added natural sweetener and no non-natural sweeteners. The fruit product also includes about 0.05% to about 0.5% by total weight of the fruit product of a galactomannan. The fruit product also has added pectin in an amount of from about 0.4% to about 2.0% by total weight of the fruit product. In addition, the fruit product has a pH of about 3.0 to about 4.2, is shelf stable and has a Brix of from about 20° to about 40°.

Typically, in accordance with another aspect of the invention, the fruit product is composed of all-natural ingredients and contains the ingredients as previously described.

The fruit product can be made by mixing pectin, a galactomannan, and water to form a thickener solution. Next, a fruit is added to the thickener to form a fruit dispersion. The fruit dispersion is then heated to a temperature from about 180° F. to about 210° F. The heated fruit dispersion is then cooled to form a fruit product having a Brix of about 20° to about 40°. Thereafter, the product is suitably packaged in an air impermeable container and can be stored under normal store conditions without refrigeration.

DETAILED DESCRIPTION OF THE INVENTION

In a preferred embodiment, the all-natural fruit product includes fruit puree, an added natural sweetener and no non-natural sweeteners. Preferably, the puree is in an amount not less than 14% by weight of the total fruit product, more preferably not less than 18%. The puree used may be a concentrate. The puree may be from a single fruit or from several fruits. Any desirable fruit puree can be used. Examples include mango, strawberry, apple, blueberry, passionfruit, pineapple, banana, raspberry, and combinations thereof.

The added natural sweetener can be any natural sweetener including, but not limited to, honey, molasses, or relatively bland tasting fruit juices. Preferably, the natural sweetener is apple juice, white grape juice, pear juice or combinations thereof. The juice used may be a concentrate. Preferably, the product does not contain sugars derived from sources other than fruit. Preferably, the added natural sweetener is present in an amount which provides a Brix of at least 10° by total weight of the fruit product, more preferably at least 11°. Juice concentrate is preferred because it contributes to fruit content including flavor at a lower viscosity than other forms of fruit.

The fruit product has about 0.05% to about 0.5% by total weight of the fruit product of a galactomannan. Guar gum, locust bean gum and tara gum are galactomannans. Preferably, the galactomannan is selected from the group consisting of locust bean gum, guar gum, and blends thereof. More preferably, the galactomannan contains about 50% to about 90% locust bean gum and about 10% to about 50% guar gum. Most preferably, the galactomannan contains about 0.12% to about 0.30% locust bean gum by weight of the fruit product and about 0.04% to about 0.20% guar gum by weight of the fruit product.

The fruit product has added pectin in an amount of from about 0.4% to about 2.0% by total weight of the fruit product. Preferably, the added pectin is a low methoxyl pectin. More preferably, the low methoxyl pectin is present in an amount from about 0.6% to about 1.5% by weight of the fruit product. When low methoxyl pectin is used in the fruit product, a divalent ion is also used. Preferably, calcium lactate is used as a source of divalent ions. More preferably, the calcium lactate is present in an amount of about 0.04% to about 0.25% by total weight of the fruit product, most preferably in an amount of about 0.06% to about 0.22%.

In addition, the fruit product has a pH of about 3.0 to about 4.2. The fruit product has a Brix of from about 20° to about 40°, preferably from about 24° to about 32°.

The fruit product may contain other natural ingredients. One such ingredient is ascorbic acid in an amount effective to prevent or reduce oxidation. Other ingredients include spices, vanilla, and other flavoring agents. The fruit product may also contain fruit juices in addition to the fruit puree and the added natural sweetener. Preferably, the fruit juice and the fruit puree are from different fruits so that an exciting flavor is created. Natural flavors can also be included such as pineapple, mango, and berry. Natural flavors are especially useful when larger quantities of natural sweetener are used to maintain the intensity of the fruit flavor. The fruit product may also contain natural colorants such as beta carotene to intensify the color provided by the various fruit components.

Preferably, there is one full serving of fruit contained in each 2.1 fluid ounce serving of the product. A serving of fruit is considered to be 4 fl. oz. of fruit. The invention provides the equivalent of 4 fl. oz. of fruit in a 2.1 fluid ounce serving of product by providing the same amount of fruit solids as 4 fl. oz. of fruit. Obviously, the amount of water and solids changes from fruit type to fruit type, and from fruit to fruit. Thus, USDA standardized serving sizes are used for purposes of comparison. The USDA has standardized a serving of apple juice at 4 fluid ounces, having a weight of 123.42 grams, and having a brix value of 11.5%. If 30 grams of apple puree concentrate having a Brix of 38° is used then the fruit equivalent of the apple puree concentrate is (30 g×38%)/(123.42 g×11.5%/serving)=0.80 servings.

Where more than one fruit type is present in the product of the invention, the weight equivalent of fruit for each fruit type is calculated and summed. For purposes of this calculation, the solids provided by a fruit-based natural sweetener are considered part of the fruit serving.

The texture of the fruit product is that of a semi-solid wet texture between yoghurt and jam, similar to applesauce. The texture is pulpy and firm, but not a gel. The texture is sufficiently firm that the fruit product can be packaged in a variety of different ways. For example, the fruit product can be packaged as a "push pop" where the fruit product is packaged in a tube and the bottom of the tube can be pushed into the tube forcing the fruit product to exit from the top of the tube.

The process of making the fruit product preferably has the following five steps. First, all of the dry non-fruit ingredients (pectin, locust bean gum, and guar gum, calcium lactate and ascorbic acid) are blended together to form a dry blend. Second, the dry blend is added to water using a high shear mixer for one minute to form a thickener. At this point, the mixture will be very thick. Third, the thickener is heated to about 140° F. to 180° F. Fourth, the fruit ingredients (fruit puree, added natural sweetener, and optionally fruit juice) are added to the heated thickener and the resulting dispersion is heated to a temperature from about 180° F. to about 210° F. Alternately, the thickener blend and fruit blend can be prepared separately and added together in a separate blending operation and the resulting dispersion is heated to a temperature from about 180° F. to about 210° F. Preferably, the dispersion is heated to a temperature no more than 195° F. for about 2 minutes to about 5 minutes. This last heating step renders the fruit product shelf-stable. Fifth, the pectin slurry is cooled and packaged in an impermeable container.

EXAMPLE 1

A mixed berry fruit product in accordance with the invention was made having the following formula:

| Ingredient | Formula Percent |
| --- | --- |
| Water | 52.85% |
| White Grape Juice Concentrate (Brix 68°) | 19.35% |
| Red Raspberry Puree Concentrate (Brix 28°) | 3.27% |
| Apple Puree Concentrate (Brix 38°) | 15% |
| Red Raspberry Juice Concentrate (Brix 65°) | 4.14% |
| Blueberry Juice Concentrate (Brix 65°) | 3.42% |
| LM Pectin | 1.2% |
| Calcium Lactate | 0.098% |
| Natural Mixed Berry Flavor WONF | 0.15% |
| Locust Bean Gum | 0.24% |
| Ascorbic Acid | 0.1% |
| Guar Gum | 0.15% |
| Brix | 26.7% |

EXAMPLE 2

A tropical fruit product in accordance with the invention was made having the following formula:

| Ingredient | Formula Percent |
| --- | --- |
| Water | 47.44% |
| White Grape Juice Concentrate (Brix 68°) | 16.9% |
| Pineapple Juice Concentrate (Brix 61°) | 8.6% |
| Mango Puree Concentrate (Brix 28°) | 8.5% |
| Apple Puree Concentrate (Brix 38°) | 15% |
| Passionfruit Concentrate (Brix 50°) | 1.4% |
| LM Pectin | 1.2% |
| Calcium Lactate | 0.098% |
| Locust Bean Gum | 0.24% |
| Ascorbic Acid | 0.1% |
| Guar Gum | 0.15% |
| Natural Pineapple Type FI | 0.15% |
| Natural Mango WONF | 0.22% |
| Brix | 27.7% |

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A method of making a shelf-stable all-natural fruit product comprising: (a) mixing pectin, a galactomannan, and water to form a thickener solution; (b) adding a fruit to the thickener to form a fruit dispersion; (c) heating the fruit dispersion to about 180° F. to about 210° F.; and (d) cooling the heated fruit dispersion to form a fruit product, wherein the fruit product has a Brix of about 20° to about 40° and wherein the fruit product is shelf stable.

2. The method of claim 1, wherein the pectin and galactomannan are mixed together when dry.

3. The method of claim 1, wherein the pectin is a low methoxyl pectin in an amount from about 0.6% to about 1.5% by weight of the fruit product and wherein the thickener solution further comprises calcium lactate.

4. The method of claim 1, wherein the galactomannan comprises about 0.12% to about 0.30% locust bean gum by weight of the fruit product and about 0.04% to about 0.20% guar gum by weight of the fruit product.

5. The method of claim 1, wherein the thickener further comprises ascorbic acid in an amount effective to prevent oxidation.

6. The method of claim 1 further comprising adding a natural sweetener to the thickener, the natural sweetener selected from the group consisting of apple juice, white grape juice, pear juice and combinations thereof.

7. The method of claim 6, wherein the added natural sweetener is present in amount which provides a Brix of at least 10° by total weight of the fruit product.

8. The method of claim 7, wherein the fruit product has a Brix of about 24° to about 32°.

9. The method of claim 1, wherein the fruit product does not contain sugars derived from sources other than fruit.

* * * * *